Figure 1:
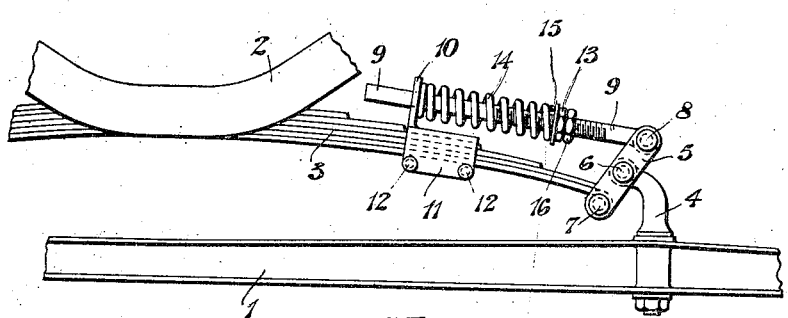

H. JOHNSON.
SPRING EQUALIZER DEVICE FOR VEHICLES.
APPLICATION FILED NOV. 12, 1921.

1,430,381.

Patented Sept. 26, 1922.

Inventor
Herbert Johnson

By Joseph F. O'Brien
Attorney

Patented Sept. 26, 1922.

1,430,381

UNITED STATES PATENT OFFICE.

HERBERT JOHNSON, OF NEW YORK, N. Y., ASSIGNOR OF ONE-HALF TO WILLIAM H. WHITE, OF BROOKLYN, NEW YORK.

SPRING-EQUALIZER DEVICE FOR VEHICLES.

Application filed November 12, 1921. Serial No. 514,555.

*To all whom it may concern:*

Be it known that I, HERBERT JOHNSON, citizen of the United States, residing at 573 Mott Avenue, the Bronx, New York, State of New York, have invented a certain new and useful Improved Spring-Equalizer Device for Vehicles, of which the following is a specification.

This invention relates to the spring suspensions of vehicles, particularly motor driven vehicles, and the improvement to which the present invention is directed is applicable to all types of suspensions whether the spring or springs thereof extend in parallelism with the axle or axles or in parallelism with or at an inclination to the longitudinal axis of the vehicle.

The object of the present invention is to provide an improved construction whereby the main spring or springs of the suspension is or are relieved of a portion of the load or tension thereon to thus improve or add to the flexibility of the same, and also to provide for the equalization of the effect of sudden shocks between the main spring or springs and an auxiliary resilient means provided in accordance with the present invention.

The improvement to which the present invention is directed is illustrated in the accompanying drawings which show its application to two different types of spring suspension, although it is to be understood that the invention is not restricted to the two specific applications thereof shown in the drawings.

In the drawings—

Figure 2:
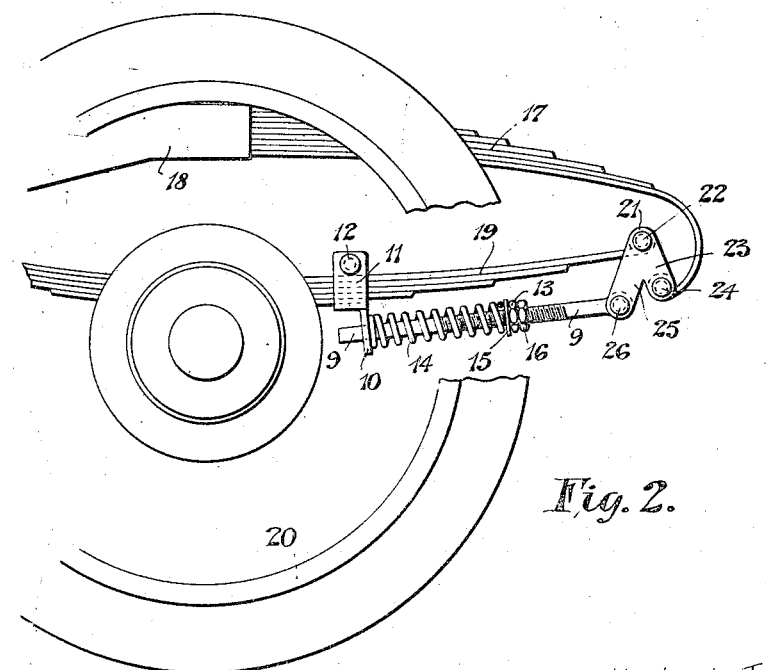

Fig. 1 illustrates the invention used in connection with a spring suspension in which a main spring is arranged in parallelism with and above the axle of the vehicle, and Fig. 2 shows the invention applied to a three-quarter elliptical spring suspension.

Referring firstly to the construction shown in Fig. 1, the numeral 1 indicates the axle of a vehicle and numeral 2 indicates a part of the frame of the vehicle. These parts are of well known construction and need not be further illustrated or described, it being of course understood that the axle supports the vehicle wheels at opposite ends thereof and that the frame supports the body of the vehicle. The main spring 3 extends in parallelism with the axle 1 above the same and is secured at its mid portion by any suitable or usual means to the frame part 2 so that said frame part is supported upon said spring. In the usual constructions, the ends of the spring 3 are connected to supports or perches 4 carried by or secured to the axle 1 by means of short links or shackles pivotally connected at their ends to the spring and perches. In accordance with the present invention these links or shackles are substituted by levers 5, which are pivotally arranged upon a pin 6 supported by the perch 4, it being understood that only one lever 5 is shown in the drawing, the other lever being behind the same. The end of the spring 3 is pivotally connected to and between the lower ends of the levers 5 by means of a pin or bolt 7 so that when the spring is subjected to tension or load the levers 5 will be rocked about the pivot upon the perch 4.

Pivotally connected to and between the upper ends of the levers 5 by means of a pin or bolt 8 is the head or outer end of a stem or rod 9, the other end of which passes through an aperture in and is thus guided by the upstanding portion or arm 10 of a bracket 11 which fits over and is firmly secured to the main spring 3 at a distance from the end thereof, as by means of pins or bolts 12. The stem or rod 9 is screw-threaded for at least a portion of the length thereof to receive a nut 13, between which and the arm 10 surrounding the stem 9 is a coiled compression spring 14, a washer 15 preferably being interposed between the nut 13 and the adjacent end of the spring. In the drawing, only one end of the spring 3 has been shown, it being understood that a similar arrangement of parts will be provided at the other end of the spring.

With the arrangement of the parts illustrated in Fig. 1, the spring 14 is under an initial compression or strain so that it takes up or supports a portion of the load of the vehicle. If the nut 13 was slacked off toward the head of the stem 9 so as to permit the spring 14 to assume a relaxed or uncompressed condition, the stem 9 would move toward the left in the figure and the levers 5 would assume a more vertical position due to the additional tension of the main spring 3 caused by this spring taking up the entire load. By adjusting the nut 13 along stem 9 so as to impart an initial compression or strain to the spring 14, the stem is moved toward the right in the figure and the levers 5 are inclined more to the vertical, assuming a position as shown in the figure, the result of this being that the main spring 3 is relieved of a portion of the load or tension thereon, which portion of the load or tension is taken up by the spring 14, thus adding to the flexibility of the main spring 3. When the main spring is subjected to a greater load the levers 5 are rocked about the pivot 6 so as to move the stem 9 toward the left in the figure, thus further compressing the spring 14 between the nut 13 and the arm 10 whereby the spring takes up an additional portion of the load applied. By adjusting the position of the nut 13 along the stem 9, the tension or strain on the spring 14 may be increased or decreased so that it will take up a greater or smaller portion of the load, correspondingly relieving the main spring of the load or tension thereon. A lock nut 16 is preferably provided on the stem 9 for locking the nut 13 in adjusted position.

It will be seen that with the arrangement described the effect of any sudden shocks to which the vehicle may be subjected will be substantially equalized between the spring 14 and the main spring 3, and also that the tension of the spring 14 eliminates the possibility of excessive lateral motion or side swing of the frame 2 and the body of the vehicle relatively to the axle.

In Fig. 2, the invention is shown applied to a spring suspension embodying a three-quarter elliptical spring comprising an upper spring 17 secured at its rigid end to frame 18 of the vehicle and connected at its other end to the end of a lower spring 19, which is supported upon the axle of the vehicle which carries the road wheel 20. In the usual constructions, the ends of the springs 17 and 19 are connected by short links or shackles, but in the present construction the ends of the springs are connected by members or levers 21 of bell-crank form, the spring 19 being connected to and between apices of the levers by means of a pin or bolt 22, and the downturned end of the spring 17 being connected to and between the arms 23 of levers 21 by a pin or bolt 24. The head or outer end of the stem 9 is pivoted to and between the other arms 25 of levers 21 by means of a pin or bolt 26. The remaining parts of the construction are substantially the same as those illustrated in Fig. 1 and these parts have been similarly numbered in Fig. 2.

Assuming that the nut 13 in Fig. 2 was slacked off to relieve the compression of spring 14, the stem 9 would be moved to the left in the figure by the movement of the spring 19 in taking up the additional portion of the load, the lever 21 assuming a position with the arm 23 thereof more vertical. If now the nut 13 is moved along the stem 9 to impart an initial compression or strain to the spring 14, this results in the stem 9 being moved toward the right in the figure so as to move the lever 21 into substantially the position illustrated in the figure, whereby the spring 19 is relieved of a portion of the tension or load thereon, this portion being taken up by the spring 14. Thus the spring 14 initially assumes a part of the load of the vehicle which would otherwise be assumed by the spring 19, so that the latter spring is relieved of this portion of the load, thereby adding to its flexibility. By adjusting the position of the nut 13 on stem 9, a greater or smaller portion of the load is taken up by the spring 14.

It will thus be understood that with the improved construction in accordance with the present invention the flexibility of the spring suspension is increased, and also that the effect of sudden shocks is equalized between the main spring or springs and the auxiliary spring 14, thus avoiding damage to or breakage of the main spring by the application of sudden shocks thereto.

It will be understood that the invention is not restricted to the detailed construction hereinbefore described as the same is capable of variation to meet different conditions and applications of the invention.

What I claim and desire to secure by Letters Patent is:

1. In a spring suspension for vehicles, the combination with a main spring interposed between the framework and an axle of the vehicle, of an abutment means on said spring, means movable by said main spring when subjected to load or shock and including an adjustable element, and resilient means interposed in its entirety between said abutment means and said adjustable element.

2. In a spring suspension for vehicles, the combination with a main spring interposed between the framework and an axle of the vehicle, of an abutment means on said spring, means movable by said main spring when subjected to load or shock, one of said means including an adjustable element, and resilient means interposed in its entirety between said adjustable element and the other of said means, and compressible throughout its entire length by the movement of said movable means.

3. In a spring suspension for vehicles, the combination with a main spring interposed between the framework and an axle of the vehicle, of resilient means, means for holding one end of said resilient means against movement, and means movable by said main spring when subjected to load or shock and operative upon the other end of said resilient means to uniformly stress the same throughout the whole length thereof, one of the two means last mentioned being adjustable to vary the normal tension or stress of said resilient means, and to simultaneously reversely vary the tension or load on the main spring.

4. In a spring suspension for vehicles, the combination with a main spring interposed between the framework and an axle of the vehicle, of resilient means, means for holding one end of said resilient means against movement, and means movable by said main spring when subjected to load or shock and operative upon the other end of said resilient means to uniformly stress the same throughout the whole length thereof, said movable means including an element adjustable to vary the normal tension or stress of said resilient means, and to simultaneously reversely vary the tension or load on the main spring.

5. In a spring suspension for vehicles, the combination with a main spring interposed between the framework and an axle of the vehicle, of resilient means, means holding one end of said resilient means against movement, and a pivoted lever having one part thereof directly connected to said main spring and having means connected with another part thereof operative upon the other end of said resilient means to uniformly stress the same throughout the whole length thereof, one of said two last mentioned means being adjustable to vary the normal tension or stress of said resilient means and to simultaneously reversely vary the tension or load on the main spring.

6. In a spring suspension for vehicles, the combination with a main spring interposed between the framework and an axle of the vehicle, of an abutment means on said spring, a pivoted lever, means having one part connected to and movable by the main spring when subjected to load or shock, one of said two means including an adjustable element, and resilient means interposed in its entirety between said adjustable element and the other of said two means and compressible throughout its entire length by the movement of said lever means.

7. In a spring suspension for vehicles, the combination with a main spring interposed between the framework, and an axle of the vehicle, of an abutment means on said spring, a pivoted lever having one part thereof connected to said main spring and movable thereby when subjected to load or shock, adjustable means connected to and movable with another part of said lever, and resilient means interposed in its entirety between said abutment means and said adjustable means.

8. In a spring suspension for vehicles, the combination with a main spring interposed between the framework and an axle of the vehicle, of an abutment means on said spring, means movable by said main spring when subjected to load or shock, and resilient means, and adjusting means therefor interposed in their entirety between said abutment means and said movable means.

9. In a spring suspension for vehicles, the combination with a main spring interposed between the framework and an axle of the vehicle, of an abutment means on said spring, means movable by said main spring when subjected to load or shock, a rod connected to one of said means and movable relatively to the other of said means, and a compression spring surrounding said rod and abutting at one end against said abutment means and at its other end against said movable means and compressible throughout its entire length by the movement of said movable means.

10. In a spring suspension for vehicles, the combination with a main spring interposed between the framework and an axle of the vehicle, of an abutment means on the spring, means movable by said main spring when subjected to load or shock, a rod connected to one of said means and movable relatively to the other thereof, an adjustable element on said rod, and a compression spring interposed in its entirety between said adjustable element and that one of said means relatively to which said rod is movable, said spring being compressible throughout its entire length by the movement of said movable means.

11. In a spring suspension for vehicles, the combination with a main spring interposed between the framework and an axle of the vehicle, of a bracket on said spring, a pivoted lever connected to and movable by said main spring when subjected to load or shock, a rod pivotally connected to said lever and guided by said bracket, and a compression spring surrounding said rod and interposed between said bracket and said movable means.

12. In a spring suspension for vehicles, the combination with a main spring interposed between the framework and an axle of the vehicle, of a bracket on said spring, a pivoted lever connected to said main spring and movable thereby when subjected to load or shock, a screw-threaded rod pivotally connected to said lever and guided by said bracket, an adjustable member threaded on said rod between said lever and said bracket, and a compression spring surrounding said rod between said bracket and said adjustable member.

In testimony whereof I affix my signature in presence of two witnesses.

HERBERT JOHNSON.

Witnesses:
WILLIAM H. WHITE,
CHAS. B. CROMPTON.